K. O. NELSON AND O. ALBERT.
BALING MACHINE.
APPLICATION FILED FEB. 24, 1919.
1,372,898.
Patented Mar. 29, 1921.
4 SHEETS—SHEET 4.
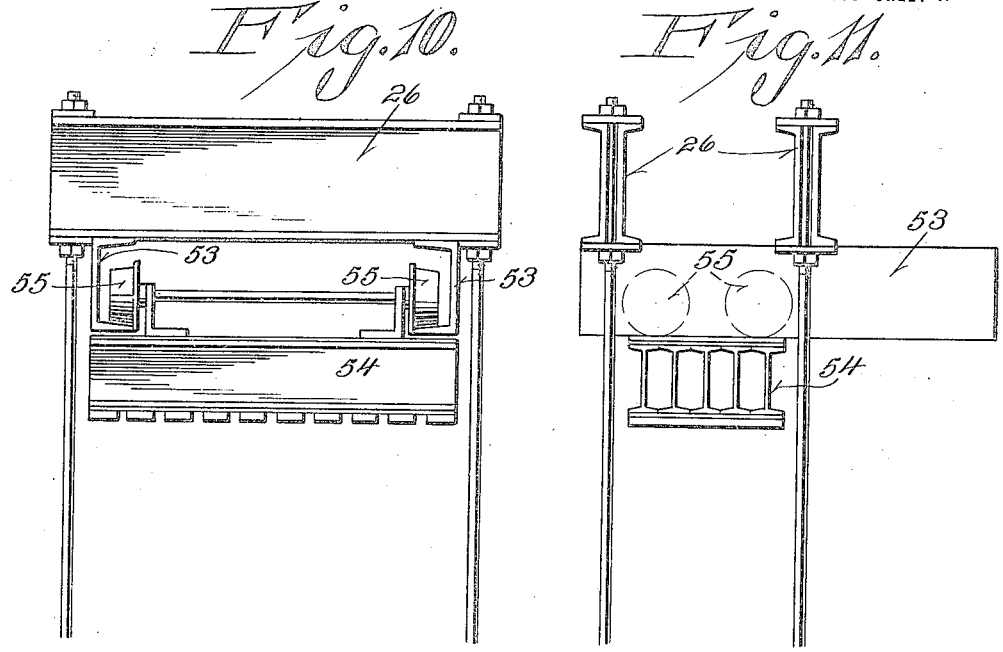
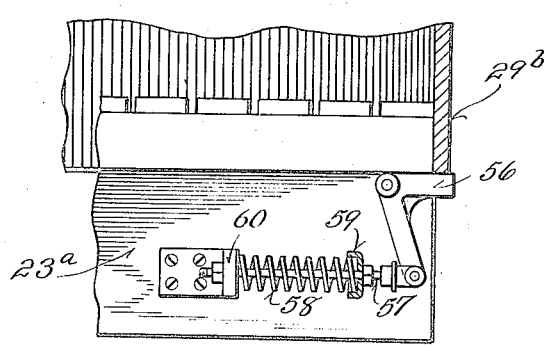
WITNESS
INVENTOR
ATTORNEYS

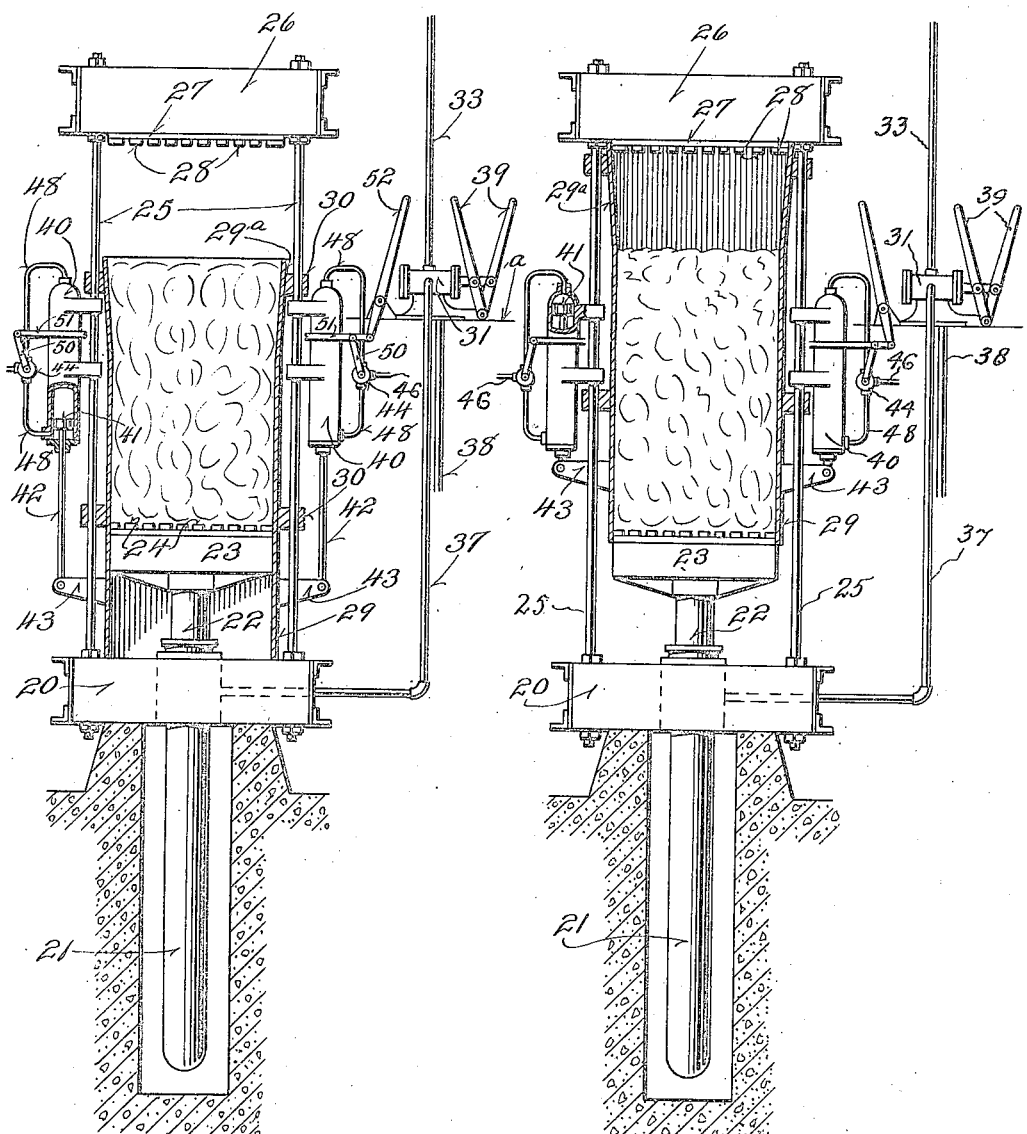

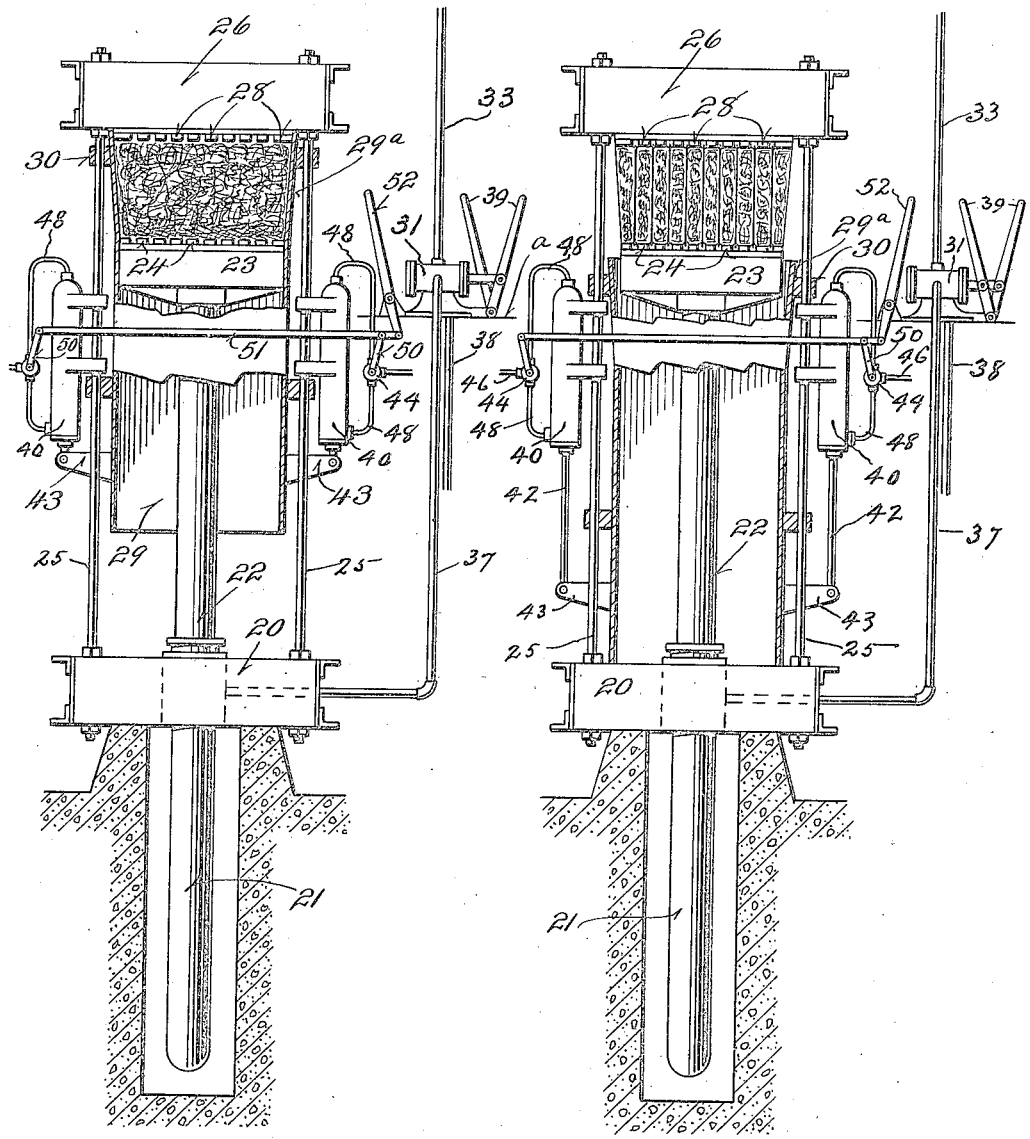

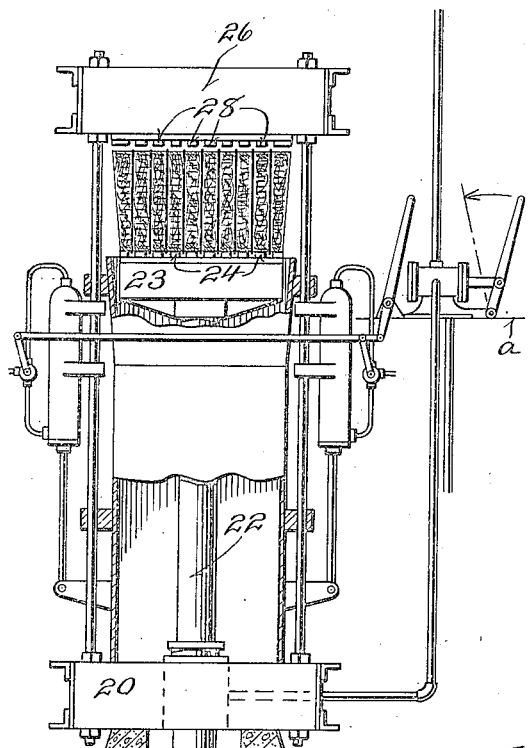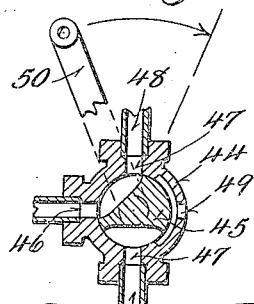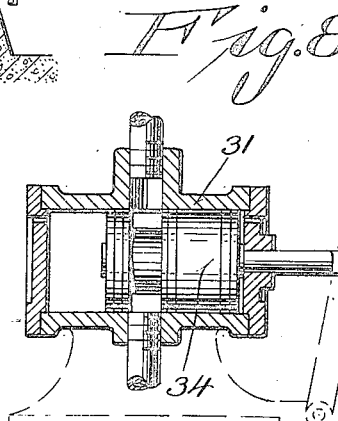

UNITED STATES PATENT OFFICE.

KARL O. NELSON AND OTTO ALBERT, OF MILWAUKEE, WISCONSIN, ASSIGNORS TO GALLAND-HENNING MFG. CO., OF MILWAUKEE, WISCONSIN.

BALING-MACHINE.

1,372,898. Specification of Letters Patent. Patented Mar. 29, 1921.

Application filed February 24, 1919. Serial No. 278,702.

*To all whom it may concern:*

Be it known that we, KARL O. NELSON and OTTO ALBERT, citizens of the United States, and residents of Milwaukee, in the county of Milwaukee and State of Wisconsin, have invented certain new and useful Improvements in Baling-Machines; and we do hereby declare that the following is a full, clear, and exact description thereof.

Our invention relates to new and useful improvements in baling machines of the broad type shown in co-pending application for patent, Serial No. 268,384, filed December 26, 1918, and comprising pressure platens and a doorless baling chamber, means being provided for procuring relative movement with respect to the platens and chamber upon compression of a bale in the chamber, to permit exposure of the pressed bale for binding and removal and thus eliminating the well known disadvantages incidental to the use of doors affording access to the baling chamber in the types of machines now in common use.

It is in general the object of our invention to simplify and otherwise improve the structure and to increase the efficiency of baling machines of the present character, and it is more particularly our object to provide an arrangement wherein exposure of the pressed bale is procured by movement of the entire baling chamber away from the platens holding the bale under compression, this arrangement being preferable under many operating conditions and eliminating the necessity of providing plungers and hydraulic cylinders for both platens, such as in the said co-pending application, thus permitting the platen structures to be of entirely conventional nature, and permitting a slidable mounting of the operatively stationary platen so that if desired material to be baled may be spouted through the frame of said platen.

A further object resides in the provision of an arrangement for relieving lateral pressure of the compressed bale material against the walls of the baling chamber upon institution of bale exposing relative movement with respect to the baling chamber and platens.

A still further object resides in the provision of means for insuring a relative proper position of the baling chamber and platens upon the institution of compressing movement of the ram platen.

With the above and other objects and advantages in view, which will be apparent as the description proceeds, our invention resides in the novel features of construction, combination and arrangement of parts as hereinafter more particularly described and defined by the appended claims.

In the accompanying drawings:

Figure 1 is a view partly in section and partly in side elevation of a baling machine embodying our invention, the ram platen and baling chamber being in retracted position to receive a charge of material to be baled.

Fig. 2 is a similar view showing the parts in position to compress the bale of material within the chamber.

Fig. 3 is a similar view of the baling machine, showing the position of the parts asumed in completing a bale compression movement.

Fig. 4 is a similar view showing the next step, wherein the baling chamber is retracted to permit binding of the bale.

Fig. 5 is a similar view showing the final step, wherein the ram platen is shifted to permit removal of the bale.

Fig. 6 is a transverse sectional view through the machine looking downwardly.

Fig. 7 is a detail transverse sectional view through the air valve for the chamber moving mechanism.

Fig. 8 is a sectional view through the control valve mechanism of the ram platen on a plane indicated by the line 8—8 of Fig. 9, and Fig. 9 is a transverse sectional view through said valve mechanism.

Figs. 10 and 11 are detailed views showing a shiftable head platen structure for association with our invention.

Fig. 12 is a detail view showing means for procuring movement of the baling chamber by the ram platen in the initial portion of the movement of said ram platen.

Referring now more particularly to the accompanying drawings, wherein is shown a preferred embodiment of our invention, there is provided a bed frame 20 which is disposed a considerable distance below the line *a* of the floor from which the machine is operated, and this frame carries a depending hydraulic cylinder 21 for moving the ram of the machine, which includes a plunger 22 slidable in the cylinder and a platen 23 on the upper end of the plunger provided with the usual slats 24 defining channels therebetween for the reception of binding wires to be placed about the compressed bale. Standards 25 rise from the bed frame 20 and carry at their upper ends a frame 26 which is disposed above the floor line $a$ and which mounts a head platen 27 provided with slats 28 coöperating with the slats 24. An open ended press-box baling chamber 29, having its wall portions rigidly and permanently connected throughout, is disposed between the standards and is mounted for vertical sliding movement by bearing lugs 30 which project laterally therefrom and receive the standards. The upper portions of the walls of the baling chamber are outwardly inclined at $29^a$ to more readily free the compressed bale from said chamber when the same is to be ejected.

A valve casing is provided which rests on the floor indicated by the line $a$ and which is provided in its upper portion with a chamber 32 communicating with a supply pipe 33 extending from a continuously driven pump, or other source of fluid supply. Valve plungers 34, two in number are slidably mounted in cylindrical chambers of the casing, and said chambers communicate with the common supply chamber 32 and with ports 35 and 36 respectively. A pipe line 37 extends from the port 35 to the hydraulic cylinder 21 and a pipe line 38 extends from the port 35 to a pump supply tank or other point of discharge. Movement of the plungers is procured by levers 39 upstanding on the floor and connected with the stems of the plungers.

To procure reciprocating movement of the press-box, cylinders 40 are mounted on the frame standards 25 at opposite sides of the chamber and pistons 41 are slidable in said cylinders, having stems 42 extending outwardly therefrom and connected with lateral brackets 43 on the lower portion of the press-box. Pressure fluid, preferably air, is selectively introduced to either end of each cylinder, or exhausted therefrom by means of a three-way valve including a casing 44 in which is rotatable a valve member 45 having its side portions cut away on oblique planes to provide communication of an intake port 46 connected with any suitable source of supply with either of two ports 47 from which pipes 48 extend to the end of the cylinder. An exhaust port 49 is provided in the casing whereby when one end of the cylinder is in communication with the supply port 46, the other end of the cylinder will be in communication with the atmosphere. Each of the valve members 45 carries a crank arm 50 outwardly of the casing, and these crank arms are connected by a link 51 for simultaneous operation, said link being connected with a main operating lever 52, which upon being shifted in either direction obviously procures upward or downward shifting movement of the press-box.

It may at this point be stated that the specific valves and operating means described, form no salient part of our invention, since the baling chamber and ram platen may be moved to and held in their various positions by any suitable means not necessarily involving fluid pressure.

In the operation of the machine, the plunger carried platen 23 is moved to its lowermost position and the baling chamber 29 is also lowered, whereby its bottom rests on the base frame 20. Material to be compressed is then placed in the press-box. The press-box is then raised to engage its upper end against the head frame 26, by suitable manipulation of the lever 52 controlling the air valves 45. The ram platen 23 is then raised to impart the desired degree of compression to the material to be baled, by shifting the valve members 34 of the casing 31 to cut off communication between the fluid supply pipe 33 and the return pipe 38 and provide communication between the pipe 33 and the hydraulic cylinder pipe 37. When the desired degree of compression is attained, the valves 34 are reversed to bypass the fluid through the pipe 38 and hold the bale under compression between the platens 23 and 27. The valves 45 are then actuated to shift the baling chamber downwardly to dispose its top slightly below the top of the ram platen 23. As this shifting movement is instituted, lateral pressure of the bale material against the walls of the chamber is relieved by reason of the taper of the upper portion of said walls. The bale is thus exposed whereby it may be bound in the usual manner. The ram platen is then shifted a slight distance downwardly as shown in Fig. 5, by opening communication of the pipe 37 momentarily with the bypass current. The bale may then be removed, and the platen 23 is then lowered to receiving or initial position, thus completing one cycle of the operation of our machine.

Attention is directed to the fact that in the simple construction shown herein as exemplifying our invention, the device embodies primarily upper and lower frame members connected by tie rods adapted to carry, not only the slidable open ended press-box, but also carry the actuating cylinders and plunger mechanism, whereby the device as a whole is compact and the pressure or strain is resisted in direct lines between the upper and lower frame members. This construction permits of economy in space and manufacture, bearing in mind that practically all of the working parts of the press are below the working floor line, so that height in the device is economized and perfect balance as to stresses is obtained.

It will also be observed that owing to this simple construction, when the press-box is dropped to its normal position, a gap is formed for feeding, whereby the material may be quickly supplied without lost motion, and particular attention is also called to the arrangement of the flared mouth of the press bale box, which is of approximately the same dimensions as the fixed platen. Hence, when the box incases this platen, there is no opportunity for the material being compressed to bulge, and the bale can also readily be extracted, by the slight downward movement of the plunger platen to relieve pressure. Furthermore the arrangement, as described, contemplates the doing away of false bottoms or other supports in an open ended press box and to utilize the reciprocative platen, which is carried by the plunger, for closing the bottom of the box. This plunger, of course, is of proper dimensions and material to fit the box snugly and to resist strains, which is not accomplished in boxes wherein a false bottom is used, and the plunger is a separate part. Such plungers are usually of less area than the false bottom, and hence such bottoms will give way under strain.

All of the features particularly called attention to are the development of much experimenting and the press as described herein is now an actual reduction to practice, there being a number of such presses in use.

The aforedescribed shiftable baling chamber may also be associated with a movable upper platen, as shown in Figs. 10 and 11, permitting the material baled to be spouted through the head frame 26. Thus in said figures, said head frame carries a depending track 53 and the movable upper platen 54 carries wheels 55 engaging these tracks in the usual manner.

It may in some instances be desirable to insure movement of the baling chamber to raised position incidental to upward movement of the ram platen, and as shown in Fig. 12, this may be effected by a connection between the ram platen and baling chamber yieldable upon predetermined pressure to permit continued compressing movement of the ram platen after the baling chamber has reached its uppermost position. In this structure, the bottom of the baling chamber 29$^b$, when said chamber is in lowered position, is disposed above the bottom of the ram platen 23$^a$, and the ram platen carries a yieldable stop member in the form of an angle lever 56 having one arm pivotally connected with a rod 57 on which is coiled a relatively strong expansile spring 58 bearing against a cap 59 on said rod and against an abutment member 60 on the platen. This spring normally urges the other arm of the lever outwardly of the platen for engagement against the bottom of the baling chamber. Thus, as the ram platen moves upwardly, it will carry the baling chamber upwardly, the lever 56 yielding when the baling chamber has reached its upper limit of movement to permit movement of the ram platen into the chamber, the baling chamber being held in raised position and subsequently lowered to expose the compressed bale by means of the pneumatic cylinders 40 and associated parts.

What is claimed is:

1. In a vertically disposed baling press having upper and lower horizontally disposed frame beams, connected by vertically disposed tie rods, the upper frame being provided with a platen which is located above the working floor of the press, and a centrally disposed reciprocative plunger located below the floor line, the combination of corresponding fluid control cylinders fixed intermediate of the tie rods, the cylinders being provided with pistons attached to reciprocative stems, a vertically disposed open end one-piece press-box in telescopic union with the plunger, and having its upper end flared to envelop and approximately correspond to the dimensions of the upper platen, the open flared mouth of the press-box being normally spaced from the upper platen to form a feed opening, a platen carried by the plunger constituting the sole bottom for the press-box, slidable bearing lugs extending from said press-box engaging the tie rods above and below the fluid control cylinders, whereby the press-box is reciprocatively guided, brackets extending from the lower end of the adjacent press-box and connected to the cylinder stems, whereby the press-box is actuated and means under control of the operator for causing lift of the press-box, and plunger platen, whereby the feed gap between the mouth of the adjacent press-box and the upper platen is closed, and the plunger carried platen continues its upward movement to effect compression, and to thereafter cause the press-box to drop to its approximate normal position, followed by a slight recession of the plunger carried platen to relieve strain from the material pressed.

2. In a vertically disposed baling press having upper and lower horizontally disposed frame beams, connected by vertically disposed tie rods, the upper frame being provided with a platen which is located above the working floor of the press, and a centrally disposed reciprocative plunger located below the floor line, the combination of corresponding fluid control cylinders fixed intermediate of the tie rods, the cylinders being provided with reciprocative stems, a vertically disposed open end one-piece press-box in telescopic union with the plunger, and having its upper end flared to envelop and approximately correspond to the dimensions of the upper platen, the open flared mouth of the press-box being normally spaced from the upper platen to form a feed opening, a platen carried by the plunger constituting the sole bottom for the press-box, slidable bearing lugs extending from said press-box engaging the tie rods above and below the fluid control cylinders, whereby the press-box is reciprocatively guided, brackets extending from the lower end of the adjacent press-box and connected to the cylinder stems, whereby the press-box is actuated, and means under control of the operator causing independent movement of the press-box, and plunger carried platen upwardly to effect compression of material and downwardly to effect release of it.

3. A baling press comprising upper and lower frame beams connected by tie rods, a centrally disposed reciprocated plunger mounted in the lower frame, a reciprocative open end press-box mounted upon the tie rods, the press-box being normally spaced a predetermined distance from the upper press frame, a platen carried by the upper press frame, means for shifting the platen, whereby clearance is had to permit material being fed into the open mouth of the press-box when the same is in normal position, and a platen carried by the plunger adapted to serve as a closure for the open bottom press-box and to compress the material therein, and means for shifting the aforesaid press-box from its normal position to a position wherein it surrounds the shiftable upper platen.

In testimony that we claim the foregoing we have hereunto set our hands at Milwaukee, in the county of Milwaukee and State of Wisconsin.

KARL O. NELSON.
OTTO ALBERT.